US007368091B2

(12) United States Patent
Manowitz et al.

(10) Patent No.: US 7,368,091 B2
(45) Date of Patent: May 6, 2008

(54) CESIUM AND STRONTIUM CAPSULE DISPOSAL PACKAGE

(75) Inventors: Bernard Manowitz, Brightwaters, NY (US); Morris Reich, Kew Gardens Hills, NY (US); James R. Powell, Shoreham, NY (US); Louis Ventre, Jr., Oakton, VA (US)

(73) Assignee: Radioactive Isolation Consortium, LLC, Falls Church, VA (US)

( * ) Notice: Subject to any disclaimer, the term of this patent is extended or adjusted under 35 U.S.C. 154(b) by 349 days.

(21) Appl. No.: 10/250,097

(22) Filed: Jun. 3, 2003

(65) Prior Publication Data

US 2004/0249234 A1 Dec. 9, 2004

(51) Int. Cl.
*B32B 9/04* (2006.01)

(52) U.S. Cl. ...................................... 422/159; 588/900

(58) Field of Classification Search ................ 422/159, 422/167; 588/1, 2, 16, 252, 256, 261, 900
See application file for complete search history.

(56) References Cited

U.S. PATENT DOCUMENTS 3,213,031 A * 10/1965 Heinemann et al. .......... 588/15
3,780,309 A 12/1973 Bouchard ................... 250/507
4,115,311 A 9/1978 Sump ...................... 252/301.1
4,209,420 A * 6/1980 Larker ......................... 588/16
4,229,316 A 10/1980 Baatz ................. 252/301.1 W
4,535,250 A 8/1985 Fields ..................... 250/507.1
H152 H 11/1986 Lampe ....................... 376/272
5,678,237 A 10/1997 Powell ........................ 588/11

* cited by examiner

*Primary Examiner*—Edward M. Johnson
(74) *Attorney, Agent, or Firm*—Louis Ventre, Jr.

(57) ABSTRACT

A package and process of using the package for disposal of radioactive cesium and strontium waste capsules. The package comprises a standard Hanford vitrified high-level waste canister as an outer container, which is approximately filled with three components: the first is a monolithic material with a defined cavity having a composite density less than about 3.5 grams per cubic centimeter and a melting temperature above that expected within the disposal package; the second is a frame for limiting relative movement of the capsules; and, the third are components forming an uninterrupted physical contact, thermal conduction pathway from the waste container to the outside of the package. The package includes lids for closing the disposal package. In the method of the invention, the capsules are loaded into position within the monolithic material, encased in thermally conducting material, and then lids are added to close the package.

3 Claims, 2 Drawing Sheets

| | Strontium | | Cesium | |
|---|---|---|---|---|
| Value | Before 12/83 | After 12/83 | Before 12/83 | After 12/83 |
| Number of Capsules | 447 | 153 | 1679 | 0 |
| Avg. Watts/Capsule | 190 | 430 | 120 | 0 |
| No. of Capsules/Canister | 8 | 3 | 12 | 0 |

FIG. 1

CESIUM AND STRONTIUM CAPSULE DISPOSAL PACKAGE

BACKGROUND OF INVENTION

The United States Department of Energy has a total of 1,936 radioactive cesium-137 (cesium) and strontium-90 (strontium) capsules, which are regarded as waste. The capsules are stainless steel containers collectively holding about 130 million curies of radioactive cesium and strontium. The cesium is in the form of cesium chloride and there are 1,335 of these capsules. The strontium is in the form of strontium fluoride and there are 601 of these capsules. The cesium and strontium are double encapsulated in two types of stainless steel tubes with welded end caps. For the cesium capsules, the inner capsule is 316L stainless and the outer capsule is 316L stainless. For the strontium capsules, the inner capsule is Hastalloy and the outer capsule is 316L stainless. 23 of the cesium capsules have an additional overpack. The outer dimensions of a cesium capsule is 6.67 centimeters (2.63 inches) in diameter and 51.05 centimeters (20.1 inches) in length and of a strontium capsule is 6.67 centimeters (2.63 inches) in diameter and 52.77 centimeters (20.78 inches) in length. For purposes of this disclosure, the waste capsules may be these exact dimensions or may be larger as a result of overpacking them in another container. Overpacking may be necessary because of any leakage or suspected leakage in a current capsule, or to increase confidence in environmental containment, or to enhance safety, or to simplify handling. Such overpacking may involve surrounding the capsule within bismuth or other metals within the overpack. Whether a cesium or strontium capsule exists as it is now packaged or it is overpacked with another capsule, the principle of the invention described herein is the same and the final capsule is referred to herein as a waste capsule, or simply a capsule.

There are two groups of capsules presently being stored. The first group of both cesium and strontium capsules was encapsulated before December 1983. The second group of strontium capsules alone was encapsulated after December 1983. The capsules have a high-thermal output and high-radiation dose rate and are stored in water-cooled pool cells at the Waste Encapsulation and Storage Facility at the Department of Energy's Hanford reservation in the State of Washington. Underwater storage removes heat and provides radiation shielding. The contents of the capsules are considered solid material.

The capsules have been identified as high-level mixed waste and disposal is subject to the Resource Conservation and Recovery Act regulations. The original planning assumption had been that the capsules would be transferred to a Waste Treatment Plant at the Hanford Site, mixed with high-level waste and then vitrified for subsequent disposal at the spent fuel and high level waste repository at Yucca Mountain, Nev. The Hanford Performance Management Plan Revision D, dated August 2002, calls for leveraging the existing safe configuration of the sealed cesium and strontium capsules to provide a permanent isolation pathway that does not require vitrification, thereby avoiding the risks associated with opening the capsules. Therefore, if a safe, simple and regulatory compliant means for disposition of the capsules could be implemented, it could have cost, safety and security benefits.

It is an object of this invention to use any standard Hanford vitrified high-level waste canister as the external container for packaging the capsules. This would facilitate disposal of the capsules at the repository. The standard Hanford vitrified high-level waste canister is described in the United States Department of Energy's Waste Acceptance Product Specifications, which are incorporated herein by reference. While the standard canister may change, the essence of the invention is to use whatever canister is the standard for vitrified high-level waste disposal. A basic principle of the invention is to provide a disposal package meeting the weight specification for high-level waste canisters. Since this regulatory weight limit is determined based upon the density of the vitrified waste within, using a disposal package applying the principles of the invention will create a disposal package meeting the regulatory weight limit. While there are other regulatory criteria to be met, the weight limit is a key critical concern when it is decided to use the same high level waste canister for a cesium or strontium capsule disposal package. So even if the size or dimensions of a standardized Hanford high-level waste canister are changed, the principles for making the cesium and strontium capsule disposal package remain the same.

Prior art describes an inner receptacle for holding waste within an outer receptacle. It teaches filling the space between the inner receptacle and outer receptacle with a mass of shielding material. If this design were used for a standard Hanford canister, it would cause the weight of the canister to exceed regulatory limits. It is an object of the present invention to meet the regulatory weight limit of 4,200 kilograms for the disposal package. Therefore, a significant improvement in existing technology is that the radiation shielding material does not fill an annular space between an inner receptacle and an outer container, but only a small hole bounded by the outer wall of the waste capsule and the inner wall of an inner container. Unlike all prior inventions, the walls of inner container fill most of the space within the outer container. Choosing an inner container lower than a specified density enables the disposal package to have a total weight less than the regulatory weight limit. In contrast to the instruction of the prior art, the inner container, that is the means for containing, is not chosen for its radiation shielding capability, but rather is chosen for its density, high melting temperature, and longevity of containment potential.

Prior art teaches the use of a sleeve within a radiation shielding material within an outer container. The sleeve surrounds, but does not encase, the waste assembly centering it and conducting heat in a desired path. As in the above example, radiation-shielding material occupies the space between the outer wall of the sleeve and the inner wall of the outer container, which would be unacceptable in terms of meeting the regulatory weight limit for the disposal package. This design improvement in the current invention reduces the volume of radiation absorbing substance to a minimum, that is, an amount required to fill a hole within a second container within the outer container. It, thus, significantly reduces the weight of a disposal package and enables the utilization of a standard Hanford vitrified high-level waste canister as the outer container in compliance with the regulatory weight limitation for repository disposal. Second, the partially encasing sleeve of the prior art is eliminated and instead the waste is encased in a thermally conducting material, which also serves to provide a necessary amount of radiation shielding to comply with repository disposal regulations. Encasement in thermally conducting material preserves the thermal conduction function and provides another high integrity container for the waste capsule.

Prior art teaches filling the outer container with a meltable heavy radiation shielding material, such as lead. The lead was typically placed between the outer container and the waste. At a density of 11.35 grams per cubic centimeter, filling with lead would result in a package too heavy for repository disposal. Lead also shrinks upon solidification and this potentially causes gaps between internal components within the disposal package. Gaps between internal components will interrupt heat transfer via thermal conductivity and could cause unacceptably high temperatures within the disposal package. The current invention is a substantial improvement to this type of prior art in several ways: Firstly, the disposal package weight is reduced to meet regulatory limits by mostly filling the outer container with an inner container made of relatively low-density material. Secondly, thermal conduction is maintained by using a shielding material that expands upon solidification and, thus, maintains physical contact between the waste capsule and the inner container. Thirdly, containment longevity is substantially improved by using a material for the inner container that has a lifetime measured in geologic time spans. And, fourthly, the prior art uses the molten lead as the encasing material between the outer container and the inner container. Should the outer container fail, the radiation shielding material, itself a hazardous substance would be exposed to the environment. The current invention seals the radiation shielding material, within the inner container and since the inner container is not made of a hazardous material, provides an added barrier to release of environmental contaminants. The present invention also uses materials for the shielding that are not listed hazardous. Thus, the filled disposal package is a waste capsule encased within a safe material, which is then sealed within a long-lived, low density, non-melting inner container, which is then sealed within the standard Hanford disposal canister. This combination of multiple high-integrity containments complies with the applicable disposal regulations.

It is an object of this invention to provide a safe, simple and regulatory compliant disposal package and method for making the package.

SUMMARY OF INVENTION

A package and method of using the package for disposal of radioactive cesium and strontium waste capsules. The disposal package is a regulatory compliant combination providing multiple high-integrity containments of waste capsules. The standard Hanford vitrified high-level waste canister is an outer container, which is approximately filled with three components: the first is a means for containing waste capsules, having a composite density less than about 3.5 grams per cubic centimeter and a melting temperature above that expected within the disposal package; the second is a means for limiting relative movement of the capsules; and, the third is a means for conducting heat away from the capsules. The package includes lids for closing the disposal package. In the method of the invention, the capsules are loaded into position within the means for containing waste capsules, encased in thermally conducting material, and then lids are added to close the package.

BRIEF DESCRIPTION OF DRAWINGS

FIG. 1 compares the number of capsules in each group and the average watts per capsules taking into account decay until year 2010.

DETAILED DESCRIPTION

Figure 2:
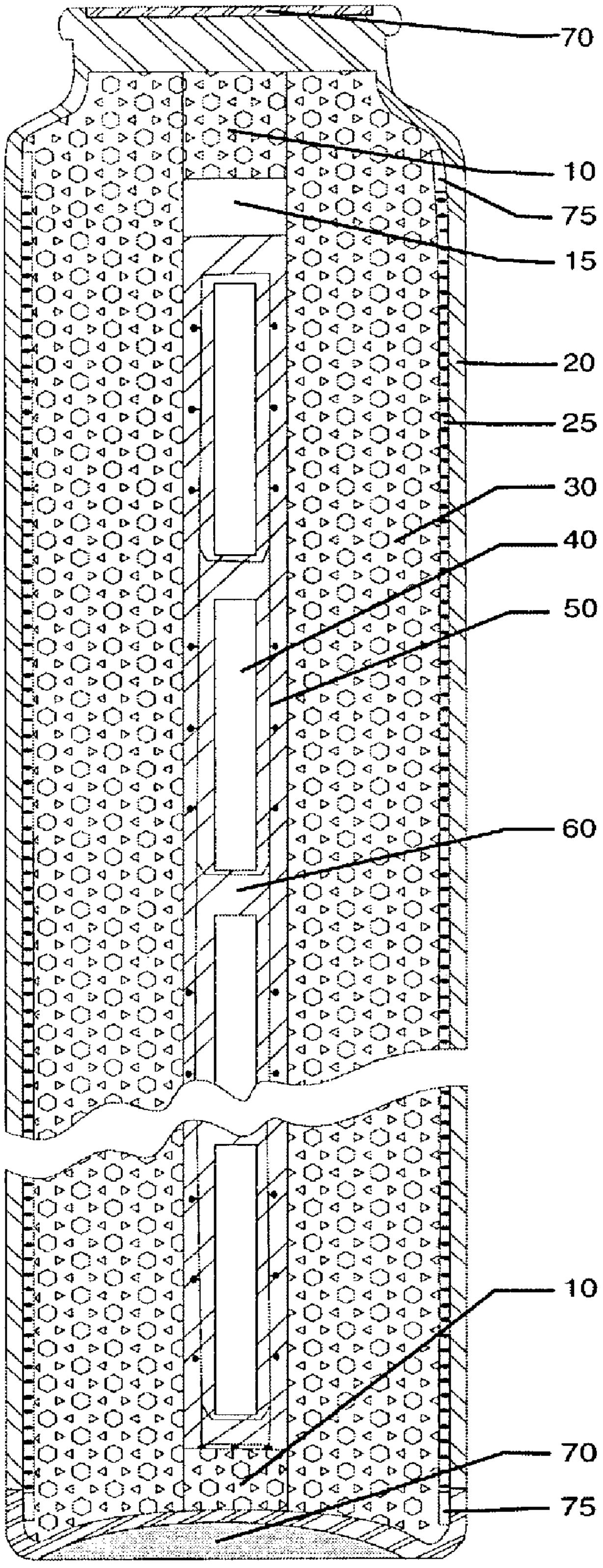
FIG. 2 shows a longitudinal cross sectional view of a cesium and strontium capsule disposal package, constructed in accordance with the principles of the preferred embodiment of this invention.

The cesium and strontium capsule disposal package first comprises a means for holding the contents of the disposal package with the external dimensions of a vitrified high-level waste canister. For the preferred embodiment, this means for holding is an outer container wherein said outer container is a standard Hanford vitrified high-level waste canister. The disposal package further comprises a means for containing one or more capsules, a means for retaining the relative position of one or more capsules, a means for conducting heat away from each capsule within the package, lids for closing the means for containing and the means for holding.

The process of using a cesium and strontium capsule disposal package involves a step for loading one or more capsules into the means for containing at the location dictated by the means for retaining; a step for employing the means for conducting heat away from each capsule; and a step of adding lids to close the means for containing and the means for holding.

The current standard Hanford vitrified high-level waste canister is described in the United States Department of Energy's Waste Acceptance Product Specifications. The exact dimensions of a standard Hanford vitrified high-level waste canister may change. Yet, compliance with the constraints of design of the invention as described herein will produce a regulatory compliant cesium and strontium disposal package. The current standard Hanford vitrified high-level waste canister is a 304L stainless steel canister about 61 centimeters (2 feet) in outside diameter, about 4.5 meters (15 feet) in height and about 1 centimeter thick. The internal volume is about 1.2 cubic meters and the regulatory weight limit for a filled canister is 4,200 kilograms (9,259 pounds). The standard Hanford vitrified high-level waste canister has a dished bottom and a flanged neck at the top.

FIG. 2 generally depicts a longitudinal cross-sectional view of the preferred embodiment of the disposal package. It shows a general approximation of a standard Hanford high-level radioactive waste canister serving as the outer container (20). Moving radially inward from the outer container is a honeycomb wall (25) located between the outer wall of the means for containing and the inner wall of the outer container. The honeycomb wall is the second part of the means for conducting heat. Space (75) above and below the honeycomb wall permits thermal expansion and contraction of the wall. Next radially inward is a thermally conducting graphite monolith (30) with a defined a cavity or hole at the centerline. The graphite has a density less than about 3.5 grams per cubic centimeter and is the means for containing one or more capsules. It can be sealed with lids (10). The next component moving radially inward is bismuth, which is the first part of the means for conducting heat (60). Encased within the bismuth is a wire structure for holding the capsules. The wire structure is the means for retaining (50). Also encased within the bismuth are capsules (40). The figure shows four such capsules. Encasement in bismuth provides a sealed containment of the capsules. The outer container lids are shown (70).

The outer container is a standard Hanford vitrified high-level waste canister. The outer container may initially be open at both ends to facilitate loading. In the event that both ends of the outer container are open, then part of the first step for loading one or more capsules involves first loading the capsules into the means for containing, then adding lids to the bottom end of the means for containing and outer container and then standing the outer container on the bottom end.

The means for containing one or more capsules is firstly any material capable of (a) holding the following components: (i) one or more capsules, (ii) a means for retaining, and (iii) a means for conducting heat; and (b) enclosing these components using one or more lids. For example, a material capable of holding these components is one that permits a hole or holes within to maintain integrity during loading and during encasing the waste capsule in thermally conducting material. A material capable of enclosing these components is one that can seal these components within using a lid at the top of each hole and one at the bottom. Secondly, the means for containing must have a composite density of less than about 3.5 grams per cubic centimeter in order to permit the filled disposal package to meet the regulatory weight limit for disposal at the repository. The means for containing may be made of more than a single material as long as the composite density, that is, the total weight divided by the volume it occupies is less than the prescribed amount. Thirdly, the means for containing must be made of one or more materials that conduct heat. Materials having a thermal conductivity of at least 60 watts per meter degree Kelvin satisfy this requirement. Finally, the means for containing must have a melting temperature higher than the maximum expected temperature during the process of using the disposal package and during final disposal. This precludes converting the means for containing into a liquid state and thus maintains its containment integrity during processing and for the long-term after repository disposal.

The means for containing must be a thermally conducting material because it must be able to conduct waste heat from the capsule to the exterior of disposal package. The thermal conductivity of the contents of the outer container together with the level of radioactivity within the capsules determines the maximum expected temperature for the disposal package. For various combinations of capsules within a disposal package, the maximum temperature will range from about 400 degrees centigrade to about 800 degrees centigrade.

While the principal form of radiation in the capsules is gamma radiation, the means for containing is not a material for shielding gamma radiation, as it is not the function of the means for containing to be a radiation shield. Such material includes, but is not limited to, graphite, carbon-carbon materials, light-weight metals such as aluminum, and light-weight metal alloys and compounds with a conductivity more than the specified amount and a density less than the prescribed amount.

For the preferred embodiment, the means for containing is a thermally conducting graphite monolith. In alternative embodiments, the graphite may be composed of consolidated or cemented particles more or less extending to the full inside dimensions of the outer container. For some embodiments, the outer dimensions of the means for containing is smaller than the dimensions of the inside of the standard Hanford high-level radioactive waste canister to leave room for adding means for conducting heat away from each capsule. For example, the diameter, the means for containing might be 55 centimeters to leave a 2-centimeter annulus for adding a thermally conducting material, such as bismuth, which expands upon solidification. An alternative embodiment of the means for containing is a graphite monolith with one or more coatings well known in the art, such as carbon/carbon or carbide coating, which diminish permeability and enhance containment of the contents of the waste package. Another alternative embodiment of the means for containing is graphite impregnated with metals, such as copper, brass, aluminum, or other elements or compounds, thus also being part of the means for thermally conducting heat away from each capsule.

An alternative embodiment of the means for containing has some fractional height of the standard Hanford high-level waste disposal canister and a diameter which would permit it to be placed within said standard Hanford canister for final disposal. Thus, the process of using this alternative embodiment inserts one or more loaded and sealed means for containing into the standard stainless steel Hanford high-level radioactive waste disposal canister as a last step. For example, a one-half or one-third-height cesium and strontium capsule means for containing, which after filling and closing would be added in appropriate numbers to fill the standard Hanford canister. The standard Hanford canister is about 4.5 meters (15 feet) in height. The capsules are about 50 centimeters (20 inches) in length. Therefore, the smallest practical fractional height for the means for containing is about one-seventh of the standard Hanford canister, which would allow up to seven of these fractional sized means for containing to be loaded into each hole in the standard Hanford canister.

The means for retaining the relative position of one or more capsules is a separating structure, such as a wire frame between waste capsules. The primary function of the means for retaining the relative position is to prevent significant movement of a waste capsule once loaded into a hole. Essentially, the means for retaining prevents waste capsules from moving closer to each other and changing position within the means for containing. Ideally, but not necessarily, means for retaining the relative position would also limit side movement of a capsule to facilitate later encasement in the means for thermally conducting heat.

In the preferred embodiment, the means for retaining the relative position of each waste capsule within a hole serves its function over the span of temperatures expected within the cesium and strontium capsule disposal package. A temperature range reasonably bracketing expected temperatures is about minus 10 degrees centigrade to about 800 degrees centigrade. Thus, a stainless steel wire frame is the preferred embodiment meeting this requirement.

In the preferred embodiment, there are two parts to the means for conducting heat. The first is thermally conducting material located in the annulus between the waste capsule and the inner wall of the means for containing; and the second is a honeycomb wall made of a thermal conducting material and located between the outer wall of the means for containing and the inner wall of the outer container, i.e. the means for holding. The function of the means for conducting is to maintain a thermal conduction pathway for the transmission of heat away from the waste capsule to the exterior of the disposal package. For both parts of the means for conducting heat, a thermal conduction pathway is created by maintaining physical contact between adjacent components within the disposal package.

For the preferred embodiment, the first part of the means for conducting heat is bismuth, a thermally conducting material that is a radiation shielding material and is a material that expands upon solidification. As a radiation shielding material, bismuth enhances the performance of the cesium and strontium capsule disposal package because it diminishes radiation external to the disposal package and lessens the risks and difficulties in handling the disposal package. Because bismuth expands upon solidification, it ensures maintenance of physical contact between the waste capsule and the means for containing. Some examples, but not all examples, of other acceptable thermally conducting materials, which expand upon solidification, are antimony, Nitonol, gallium and other alloys and compounds.

In the preferred embodiment of the process of using, bismuth is precast in two halves. Each half has half of the means for retaining and half of a compartment to hold a waste capsule. After placement of a capsule into a half casting, the other half is joined with it to enclose the waste capsule in a cartridge-like shuttle pod having dimensions approximately matching the hole in the means for containing. The step for employing the means for conducting heat away from each capsule establishes a thermal conduction pathway between and among the contents of the disposal package. For the preferred embodiment, this step for employing melts the shuttle pod after it is inserted into the means for containing to thoroughly encase the contents of the hole in bismuth. For other embodiments, a thermal conduction pathway is established by adding an acceptable thermally conducting material to the hole after the capsules are added to the hole. In some embodiments, the thermally conducting material is then melted. Melting occurs by adding heat by methods well known in the art, such as for example by induction heating. Whether melted before or after insertion in a hole, molten encapsulation within thermally conducting material provides an additional barrier to contain a release of the radionuclides from the waste capsule. An alternative is adding the thermally conducting material in a molten state. A second alternative is adding the thermally conducting material in a solid state and not melting it.

For the preferred embodiment, the second part of the means for conducting heat is a honeycomb wall made of aluminum. For alternative embodiments, a metal such as copper is used. The honeycomb wall provides a spring-like connection between most of the outer wall of the graphite inner mass with most of the inner wall of the outer container, enhancing physical contact and providing a shock absorbing capability within the disposal package. Space (75) above and below the honeycomb wall permits thermal expansion and contraction of the wall. The process step for loading one or more capsules into the means for containing includes inserting the means for containing into the outer container such that the honeycomb wall is in physical contact with the outer wall of the means for containing and the inner wall of the outer container. Thus, this action in the step for loading supports the step for employing the means for conducting heat.

An alternative embodiment of the disposal package, eliminates the honeycomb wall and creates the thermal conduction pathway by establishing physical contact by heating the outer container to expand it and then inserting a cooler means for containing. When the combination is cooled to ambient temperature, both components are in physical contact.

For the first part of the means for conducting heat, an air gap (15) at the top of the hole above the top of the thermally conducting material is permissible and leaves room for expansion of thermally conducting material and any gases that may evolve. In the preferred embodiment of the process of using, the shuttle pod is of such volume as to form this air gap after melting and solidification.

In all embodiments of the invention, the thermally conducting material will have a melting point below that of stainless steel in order to avoid melting the stainless steel of the cesium and strontium capsules or the separating structure. From a practical standpoint, the melting point of the thermally conducting material should be lower than the phase change temperature for the cesium chloride within the cesium capsule in order to avoid capsule damage from about a 15 percent swelling that occurs at the phase change temperature. For pure cesium chloride, the phase change temperature is 469 degrees centigrade and would be lower for non-pure cesium chloride. A significantly lower phase change temperature may not be a significant issue since the centerline temperature of the cesium capsules as reported in 1984 was 430 degrees centigrade.

The lids used for the invention close each open hole in the means for containing and in the outer container. In the preferred embodiment, the lids for the hole or holes (10) are made of graphite and are added to the means for containing using graphite cement, well known in the art for joining and sealing together two graphite pieces. For most embodiments, the lid or lids for the outer container (70) are made of the same material as the outer container and would be added to the container by means well known in the art to provide an airtight seal. In the preferred embodiment, the lids are made of 304L stainless steel and are welded to the outer container.

In the preferred embodiment of the disposal package as shown in FIG. 2, the graphite at the top and bottom of the hole or holes may be provided by graphite lids (10), or one of these may simply remain as part of the graphite not affected by a hole-making process. Graphite is a crystalline form of carbon and is already in a stable chemical state. Encasing the capsules in graphite serves to isolate the capsules and the means for conducting heat from the biosphere for a very long period of time, ostensibly for millions of years, but certainly well in excess of 10 half lives of both cesium-137 and strontium-90. The half-life of cesium-137 is about 30 years and the half-life of strontium-90 is about 29 years.

The most efficient number of the holes in the graphite is determined by compliance with four primary Waste Acceptance Product Specifications criteria for waste canister disposal at the Yucca Mountain repository. To meet these criteria, the cesium and strontium capsule disposal package complies with the following canister limits: 1) The heat generation rate may not exceed 1,500 watts per canister. 2) The radiation level at the surface of the canister may not exceed 100,000 roentgen equivalent man per hour. 3) The maximum canister surface temperature cannot exceed 400 degrees centigrade. 4) The maximum loaded canister weight may not exceed 4,200 kilograms.

The hole or holes in the graphite may be provided by any number of ways well known in the art, for example they may be drilled out or cored from the graphite. As a further example, they might also be provided through casting of the graphite. The diameter of the hole or holes must be larger than the diameter of the capsules requiring disposal such that the capsule, or a frame holding one or more capsules, can be easily inserted into the canister and surrounded by the thermally conducting material, but not so large that the regulatory weight limit for the waste package is exceeded. In one embodiment of the invention, a single hole is co-axially located as shown in FIG. 2. For this preferred embodiment, the diameter of the hole is leaves about 5 centimeters (2 inches) of annulus around the capsule to fill with bismuth. Since the capsules are about 6 centimeters in diameter, then, the outer diameter of the hole is about 16 cm in diameter.

For the capsules at Hanford using the preferred embodiment, a limiting criterion for the number of capsules in a cesium and strontium capsule disposal package is the heat generation rate. There are two groups of capsules presently being stored. The first group of both cesium and strontium were encapsulated before December 1983. The second group of strontium alone was encapsulated after December 1983. The number of capsules in each group and the average watts per capsule taking into account decay until 2010 is shown in FIG. 1.

For one embodiment of the invention, six cesium capsules would be inserted into a cesium and strontium capsule disposal package. In order to fit twelve or eighteen capsules into a cesium and strontium capsule disposal package, embodiments with a second and third hole, respectively, would be required.

The surface radiation level is governed by the cesium-137 capsules, since cesium-137 is the only gamma emitter. The average activity is 25,000 curies per capsule ($9.25\times10^{14}$ becquerel). Thus, for a 12-capsule cesium and strontium capsule disposal package, there is a total of 300,000 curies of cesium-137 in a loaded cesium and strontium capsule disposal package. The surface radiation level is roughly 60,000 roentgen equivalent man per hour (600 Sieverts) and is, thus, below the maximum permissible levels. Higher capsule dose rates exceeding the 100,000 roentgen equivalent man per hour threshold, require increasing the diameter of the hole or holes, such that the thermally conducting material surrounding the capsules and filling the annulus provide increased shielding.

As shown in FIG. 1, the post December 1983 strontium capsules produce on average the most watts. This means that the strontium-90 is the limiting decay heat generating radionuclide. The maximum surface temperature of the average strontium capsule in air is 430 degrees centigrade and the maximum centerline temperature of an average strontium capsule is 800 degrees centigrade. The maximum strontium-90 concentration in three high activity capsules encapsulated after December 1983 will be about 63,000 curies, whereas eight strontium-90 capsules encapsulated before December 1983 would contain about 23,000 curies each. Based on the values given in FIG. 1, the least likely number of disposal packages is 140 cesium-137 disposal packages and 107 strontium-90 disposal packages produced in the entire campaign. In all cases, a means for thermally conducting heat is essential to the invention to ensure a low enough surface temperature that it does not become a problem for repository disposal.

In the process of using the invention, there is a first step, that is a step for loading one or more capsules into the means for containing at the location dictated by the means for retaining. The step for loading first involves preparing a disposal package by combining the means for containing with the outer container and the honeycomb wall. As a preliminary, the step for loading may involve, but is not required to involve, overpacking the waste capsule in a new stainless steel capsule. This overpacking may involve surrounding the waste capsule within bismuth or other metals within the overpack. If overpacking occurs, the overpacked capsule is referred to herein, and becomes the waste capsule. Whether or not overpacking occurs, the step for loading involves the assembly of one or more capsules within the means for retaining, or in the case of the preferred embodiment, the shuttle pod. Once assembled, the means for retaining or the shuttle pod is moved into a hole in the means for containing.

For the preferred embodiment, moving the shuttle pod into a hole in the means for containing occurs while the disposal package is positioned horizontally. A tall disposal is more easily loaded in the horizontal position. In the preferred embodiment, both ends of the disposal canister are open to permit the air volume being displaced by the shuttle pod to exit the end opposite the insertion end. The step for loading then involves adding a lid to the bottom of the hole and the bottom of the outer container. Completing the step for loading involves standing the disposal package on the closed end with the opening at the top. In alternative embodiments, loading occurs while the disposal package is placed vertically. If more than one hole is present in the means for containing, additional shuttle pods would be inserted to fill these holes.

The second step of the process of using is a step for employing the means for conducting heat away from each capsule. This step involves ensuring physical contact between adjacent components within the disposal package so that a thermal conduction pathway is established for removal of heat from the waste capsule. As described above, it involves encasing the contents of the hole in thermally conducting material. For the preferred embodiment, employing the means for conducting heat is by melting the shuttle pod within the hole by means well known in the art. In the preferred embodiment, the second part of the means for conducting heat, namely the honeycomb wall, is added as part of the step for loading. For an alternative embodiment, this step involves pouring molten thermally conducting material around the contents of the hole. For another embodiment, this step involves surrounding the contents of the hole with thermally conducting material.

The third step in the process of using is the step of adding lids to close each hole opening in the means for containing and to close the top of the outer container. At this point in the process, only the top end of the means for containing and the outer container would be open and require closure with lids. The top hole or holes in the means for containing are closed with the lids of claim 1, step (d). The outer container is closed with a lid of claim 1, step (e).

While there has been described herein what is considered to be the preferred exemplary embodiment of the present invention, other modifications of the shall be apparent to those skilled in the art from the teachings herein, and it therefore, desired to be secured in the appended claims all such modifications as fall the true spirit and scope of the invention.

Accordingly, what is desired to be secured by Letters Patent of the United States the invention as defined and differentiated in the following claims in which we claim:

1. A cesium and strontium capsule disposal package comprising, (a) a means for holding contents of the disposal package wherein said disposal package has the external dimensions of a vitrified high-level waste canister; (b) a means for containing one or more capsules; (c) a means for retaining in relative position one or more capsules; (d) a means for conducting heat from within the package providing uninterrupted contact from the capsule to the exterior of the package; and, (e) lids for closing the means for containing and the means for holding.

2. A process of using the cesium and strontium capsule disposal package of claim 1 comprising, (a) a step for loading one or more capsules into the means for containing at the location dictated by the means for retaining; (b) step for employing the means for conducting heat from within the package to the exterior of the package; and (c) step of adding lids to close the means for containing and the means for holding.

3. A process of using the cesium and strontium capsule disposal package of claim 1 comprising, (a) a step for loading one or more capsules into the means for containing at the location dictated by the means for retaining; (b) step for employing the means for conducting heat from within the package to the exterior of the package; (c) a step of sealing the means for containing; (d) step for loading the means for containing into the means for holding; and (e) step of adding a lid for each open end of said means for holding.

* * * * *